United States Patent [19]

Cheng et al.

[11] Patent Number: 4,528,664
[45] Date of Patent: Jul. 9, 1985

[54] CALL PROGRESS SIGNAL MONITOR AND METHOD FOR TELEPHONE SYSTEMS

[75] Inventors: Chao-Jan Cheng; John R. Donak; Samir E. Ahad, all of Belleville, Canada

[73] Assignee: Northern Telecom Limited, Montreal, Canada

[21] Appl. No.: 445,246

[22] Filed: Nov. 29, 1982

[51] Int. Cl.³ .................... H04J 3/12; H04M 19/02
[52] U.S. Cl. ......................... 370/110.3; 179/84 VF
[58] Field of Search ............... 370/110.3; 179/84 VF, 179/84 R; 364/484

[56] References Cited

U.S. PATENT DOCUMENTS

| | | | |
|---|---|---|---|
| 3,046,345 | 7/1962 | Harris et al. | 370/110.3 |
| 3,710,028 | 1/1973 | Pitroda | 370/110.3 |
| 4,069,399 | 1/1978 | Barrett et al. | 370/67 |
| 4,203,008 | 5/1980 | Cohn-Sfetcu et al. | 370/50 |
| 4,213,201 | 7/1980 | Gagnier et al. | 370/62 |
| 4,277,650 | 7/1981 | Arend et al. | 179/84 VF |
| 4,379,347 | 4/1983 | Girardi et al. | 375/94 |
| 4,439,639 | 3/1984 | Munter | 179/84 VF |

OTHER PUBLICATIONS

"An Evaluation of Two Simple Methods for Detecting Tones over Telephone Lines", vol. 56, No. 8, Oct. 1977, by D. K. Christopher et al., pp. 1513–1529, "The Bell System Technical Journal".

Primary Examiner—Thomas W. Brown
Attorney, Agent, or Firm—J. E. Moorhouse

[57] ABSTRACT

A call progress signal monitor includes a translation circuit for generating data signals indicative of predetermined signal characteristics in a TDM PCM signal channel. A processor implemented detection circuit is responsive to the data signals for detecting call progress tones and silence. The translation circuit includes a translation ROM for assigning PCM signal samples with code values in a range with maximum and minimum limits. A comparator generates a comparison value signal in response to the code values of an instant sample and an immediately previous sample. An encoding ROM generates a trend data byte in response to an instant comparison value signal and a plurality of consecutive previous comparison value signals. The instant code value and the instant trend data byte comprise data signals for identification of the progress tones and silence occurrences by the detection circuit. In the detector a first frequency is derived from an average period of time between code values corresponding to extreme or peak code values in a direction of one of the limits. In a case where the peak code values are dissimilar an envelope frequency is derived from a period of time between peak code values of a greatest dissimilarity. A second frequency is derived as a difference of the envelope frequency being subtracted from the first frequency.

7 Claims, 4 Drawing Figures

CALL PROGRESS SIGNAL MONITOR AND METHOD FOR TELEPHONE SYSTEMS

The invention relates to telephone system call progress tones and the like, and more particularly relates to a circuit and method for distinguishing these tones.

In telephone systems call progress tones are provided for audibly indicating to a caller the status of a telephone call. In placing a telephone call, in a publicly accessible telephone system, the first progress tone recognized by the caller is that of dial tone. Dial tone indicates that the telephone system is ready to receive dialled digits for identifying a called party. After dialing the caller will typically hear one of ring back, busy, or reorder tones. A successful connection to the called party is indicated by a cessation of the ring back tone, which is of course followed by the answering party's voice.

In distinction to a publicly accessible telephone system, a call in a private telephone system or private branch exchange (PBX) may involve more than one dial tone occurrence if for example the call is being placed from the PBX to the publicly accessible telephone system or to another PBX via a private transmission facility. Various call progress tones frequently occur at intervals in a typical dialling sequence for calls placed between PBXs via private network transmission facilities. Calling convenience and network management are enhanced by provision of a progress tone monitor or detection apparatus to facilitate appropriate machine response to progress tone occurrences. One such apparatus for recognizing single frequency dial tone is described by I. Arend et al. in U.S. Pat. No. 4,277,650 issued on July 7, 1981 and assigned to the present assignee. Unfortunately, telephone networks do not have a precise progress tone plan. Thus there is substantial variation is signal frequencies and cadence used by various telephone utilities and private networks.

Various call progress tones are listed in a publication entitled "Notes on the Network" published in 1980 by the American Telephone and Telegraph Company at pages 110 to 119. The most common of the call progress tones are dial tone, audible ringing tone, busy tone, and reorder tone. The precise tone plan specification for the North American network defines these tones as follows, dial tone is a continuous tone having frequencies of 350 and 440 Hz at a level of -13dbm. Audible ringing tone is defined as comprising frequencies of 440 and 480 Hz at a level of -19dbm and a cadence of 2 seconds ON and 4 seconds OFF. Busy tone is defined as having frequency components of 480 and 620 Hz at a level of -24dbm and a cadence of half a second ON and half a second OFF, whereas reorder tone contains the same frequency components at a similar level but with a cadence of 0.25 of a second ON and 0.25 of a second OFF. Other frequencies and levels are generated by older equipment which does not follow the precise tone plan; these tones are either formed as dual frequency tones or as amplitude modulated signals where a higher frequency is modulated by a lower frequency.

It is therefore desired to provide a circuit for reliably identifying call progress tones in a telephone network. It is further desired to provide such a circuit that operates on digital signals as for example are found in digital telephone systems such as described in U.S. Pat. No. 4,069,399, entitled "A TDM PDM Communication System", and in U.S. Pat. No. 4,213,201 entitled "Modular Time Division Switching System".

THE INVENTION

In accordance with the invention a call progress signal monitor includes a translation circuit for generating data signals indicative of predetermined characteristics in a bit stream of plural bit encoded positive and negative sign samples. A detection circuit is responsive to the data signals for detecting call progress tone signals and silence. The call progress signal monitor is characterized in that the translation circuit includes a translator for translating an instant occurring sample into an instant data word having a code linearized value with reference to a level corresponding to at least a maximum possible value of the samples. A comparing circuit generates a comparison value signal in response to levels of the instant data word and an immediately previous data word. An encoding circuit generates trend data words in response to an instant comparison value signal and a plurality of consecutive previous comparison value signals. Each of the data signals for use in the detection circuit is comprised of the instant data word and a corresponding trend data word.

The invention is also a method for machine distinguishing call progress signals as typically are used in a telephone system. Signal samples from a communication path in the telephone system are translated into corresponding data words each having a value in a range being defined by predetermined limits of maximum and minimum values, wherein maximum amplitude positive and negative sign signal samples each correspond to a respective one of said limits. A first frequency component in a series of the signal samples is derived as a reciprocal of an average period of time between ones of the signal samples occurring with extreme values in a direction toward one of said limits, whereby the highest frequency component in a call progress signal is defined. These extreme values are also referred to as peak amplitudes. In response to the extreme values being dissimilar, an envelope frequency component is derived as a reciprocal of a period of time between the signal samples occurring with a greatest difference between their respective extreme values. A second frequency component is derived as a difference of the envelope frequency being subtracted from the first frequency whereby a frequency component being lower than the highest frequency component in the call progress signal is defined.

In one embodiment the detection circuit includes means by which a trend data word representative of an increasing trend which reverses to a decreasing trend is recognized as a peak amplitude occurrence in signals being received by the call progress signal monitor.

An example embodiment of a call progress signal monitor in accordance with the invention is discussed with reference to the accompanying drawings in which.

Figure 1:
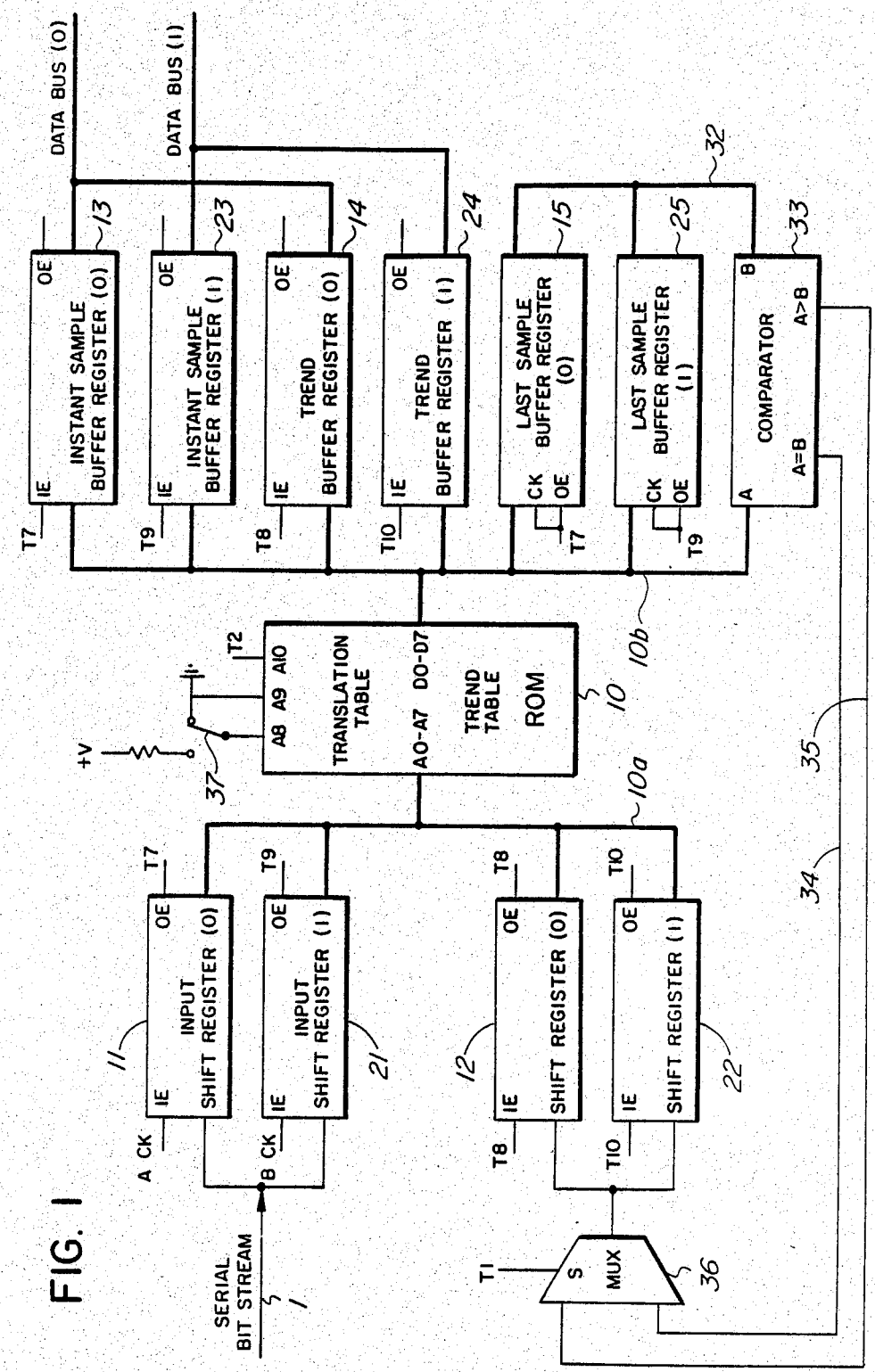
FIG. 1 is a block diagram of a translation circuit used in the call progress signal monitor.

Table A appear at the data outputs D0–D7 of the ROM 10 during times as selected by the timing signal T2 being applied at address input A10.

TABLE A

Hexadecimal listing of linearizing translation table in the ROM 10.

μLaw/A Law Indicator
PCM Bytes (From Bus 10a)
Code Values

| | | | | | | | | | | | | | | | | | | | |
|---|---|---|---|---|---|---|---|---|---|---|---|---|---|---|---|---|---|---|---|
| 0 | 0 | 0 | 00 | 01 | 02 | 03 | 04 | 05 | 06 | 07 | 08 | 09 | 0A | 0B | 0C | 0D | 0E | 0F |
| 0 | 1 | 0 | 10 | 11 | 12 | 13 | 14 | 15 | 16 | 17 | 18 | 19 | 1A | 1B | 1C | 1D | 1E | 1F |
| 0 | 2 | 0 | 20 | 21 | 22 | 23 | 24 | 25 | 26 | 27 | 28 | 29 | 2A | 2B | 2C | 2D | 2E | 2F |
| 0 | 3 | 0 | 30 | 31 | 32 | 33 | 34 | 35 | 36 | 37 | 38 | 39 | 3A | 3B | 3C | 3D | 3E | 3F |
| 0 | 4 | 0 | 40 | 41 | 42 | 43 | 44 | 45 | 46 | 47 | 48 | 49 | 4A | 4B | 4C | 4D | 4E | 4F |
| 0 | 5 | 0 | 50 | 51 | 52 | 53 | 54 | 55 | 56 | 57 | 58 | 59 | 5A | 5B | 5C | 5D | 5E | 5F |
| 0 | 6 | 0 | 60 | 61 | 62 | 63 | 64 | 65 | 66 | 67 | 68 | 69 | 6A | 6B | 6C | 6D | 6E | 6F |
| 0 | 7 | 0 | 70 | 71 | 72 | 73 | 74 | 75 | 76 | 77 | 78 | 79 | 7A | 7B | 7C | 7D | 7E | 7F |
| 0 | 8 | 0 | FF | FE | FD | FC | FB | FA | F9 | F8 | F7 | F6 | F5 | F4 | F3 | F2 | F1 | F0 |
| 0 | 9 | 0 | EF | EE | ED | EC | EB | EA | E9 | E8 | E7 | E6 | E5 | E4 | E3 | E2 | E1 | E0 |
| 0 | A | 0 | DF | DE | DD | DC | DB | DA | D9 | D8 | D7 | D6 | D5 | D4 | D3 | D2 | D1 | D0 |
| 0 | B | 0 | CF | CE | CD | CC | CB | CA | C9 | C8 | C7 | C6 | C5 | C4 | C3 | C2 | C1 | C0 |
| 0 | C | 0 | BF | BE | BD | BC | BB | BA | B9 | B8 | B7 | B6 | B5 | B4 | B3 | B2 | B1 | B0 |
| 0 | D | 0 | AF | AE | AD | AC | AB | AA | A9 | A8 | A7 | A6 | A5 | A4 | A3 | A2 | A1 | A0 |
| 0 | E | 0 | 9F | 9E | 9D | 9C | 9B | 9A | 99 | 98 | 97 | 96 | 95 | 94 | 93 | 92 | 91 | 90 |
| 0 | F | 0 | 8F | 8E | 8D | 8C | 8B | 8A | 89 | 88 | 87 | 86 | 85 | 84 | 83 | 82 | 81 | 80 |
| 1 | 0 | 0 | 2A | 2B | 28 | 29 | 2E | 2F | 2C | 2D | 22 | 23 | 20 | 21 | 26 | 27 | 24 | 25 |
| 1 | 1 | 0 | 3A | 3B | 38 | 39 | 3E | 3F | 3C | 3D | 32 | 33 | 30 | 31 | 36 | 37 | 34 | 35 |
| 1 | 2 | 0 | 0A | 0B | 08 | 09 | 0E | 0F | 0C | 0D | 02 | 03 | 00 | 01 | 06 | 07 | 04 | 05 |
| 1 | 3 | 0 | 1A | 1B | 18 | 19 | 1E | 1F | 1C | 1D | 12 | 13 | 10 | 11 | 16 | 17 | 14 | 15 |
| 1 | 4 | 0 | 6A | 6B | 68 | 69 | 6E | 6F | 6C | 6D | 62 | 63 | 60 | 61 | 66 | 67 | 64 | 65 |
| 1 | 5 | 0 | 7A | 7B | 78 | 79 | 7E | 7F | 7C | 7D | 72 | 73 | 70 | 71 | 76 | 77 | 74 | 75 |
| 1 | 6 | 0 | 4A | 4B | 48 | 49 | 4E | 4F | 4C | 4D | 42 | 43 | 40 | 41 | 46 | 47 | 44 | 45 |
| 1 | 7 | 0 | 5A | 5B | 58 | 59 | 5E | 5F | 5C | 5D | 52 | 53 | 50 | 51 | 56 | 57 | 54 | 55 |
| 1 | 8 | 0 | D5 | D4 | D7 | D6 | D1 | D0 | D3 | D2 | DD | DC | DF | DE | D9 | D8 | DB | DA |
| 1 | 9 | 0 | C5 | C4 | C7 | C6 | C1 | C0 | C3 | C2 | CD | CC | CF | CE | C9 | C8 | CB | CA |
| 1 | A | 0 | F5 | F4 | F7 | F6 | F1 | F0 | F3 | F2 | FD | FC | FF | FE | F9 | F8 | FB | FA |
| 1 | B | 0 | E5 | E4 | E7 | E6 | E1 | E0 | E3 | E2 | ED | EC | EF | EE | E9 | E8 | EB | EA |
| 1 | C | 0 | 95 | 94 | 97 | 96 | 91 | 90 | 93 | 92 | 9D | 9C | 9F | 9E | 99 | 98 | 9B | 9A |
| 1 | D | 0 | 85 | 84 | 87 | 86 | 81 | 80 | 83 | 82 | 8D | 8C | 8F | 8E | 89 | 88 | 8B | 8A |
| 1 | E | 0 | B5 | B4 | B7 | B6 | B1 | B0 | B3 | B2 | BD | BC | BF | BE | B9 | B8 | BB | BA |
| 1 | F | 0 | A5 | A4 | A7 | A6 | A1 | A0 | A3 | A2 | AD | AC | AF | AE | A9 | A8 | AB | AA |

Figure 3:
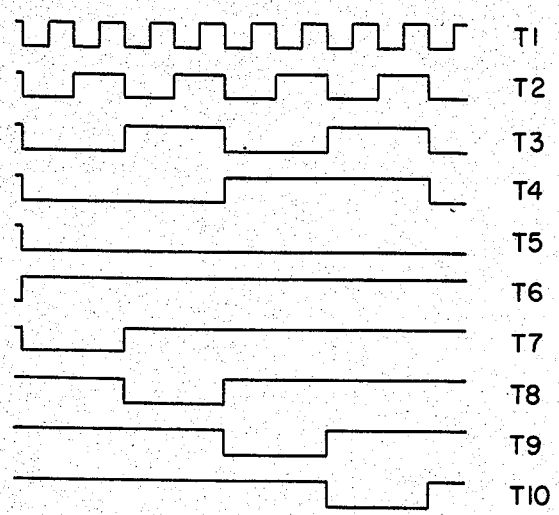
FIG. 3 is a graphical representation of timing signal wave forms T1 through T10 as generated by a timing generator 110 in FIG. 2.

The translation circuit in FIG. 1 performs preliminary signal translating coding upon up to two channels (0 and 1) of PCM signals as typically used in a digital signal telephone system. Circuit elements labelled with identifying numbers 11–15 are dedicated to channel (0) signals, and corresponding circuit elements dedicated to channel (1) signals are labelled with identifying numbers 21–25. Timing signals in accordance with those labelled T1–T10 in FIG. 3 are provided by any of various clock, counter, and decoder arrangements well known to persons of skill in the electronic art. These signals are used as indicated in FIG. 1 to sequence the functions of the various circuit elements.

PCM signals are received serially by input shift registers 11 and 21 under control of respective A clock and B clock signals supplied to input enables IE by an associated telephone facility (not shown), for defining the channels in a TDM frame which are to be monitored. As operation in respect to both the channels is substantially identical, only the operation in respect to channel 0 is described in detail. After the input shift register 11 has received a PCM signal byte, the PCM signal byte is coupled in parallel from tri-state outputs of the input shifter register 11 via an address bus 10a to address inputs A0–A7 of a read only memory (ROM) 10. The ROM 10 contains a translation table which converts a PCM byte to a corresponding coded value. Translation for both μlaw and A law PCM standards are alternately selectable in accordance with the binary state of an address input A8 of the ROM 10 as determined at a switch 37. Eight bit coded vaues in accordance with Coded values are coupled from the ROM 10 via a data bus 10b to an instant sample buffer register 13 for storage therein under control of the timing signal T7 at an input enable IE. The content of the instant sample buffer register 13 is available on a data bus (0) in response to assertion of a control signal at an output enable OE. The code values are also coupled via the data bus 10b to a last sample buffer register 15 under control of a positive going edge of the timing signal T7 at a clock input CK. However just prior to this, the previous occurring code value is coupled from tri-state outputs of the last sample buffer register 15 via a bus 32 to a B input of a digital comparator 33. The digital comparator 33 compares the sample at its B input with the instant sample at its A input connected with the bus 10b to provide appropriate binary signal assertions at A equal to B and A greater than B outputs. The signal states of these outputs are sequentially gated under the control of the timing signal T1 by a multiplexor 36 to an input of a shift register 12. Serial loading of the shift register 12 is controlled by the positive going edge of the timing signal T8, applied at the input enable IE of the shift register 12. Hence the shift register 12 holds an eight bit record of the latest four sample comparisons performed by the comparator 33. During assertion of the timing signal T8 at an output enable OE of the shift register 12, the latest four comparisons are applied from tri-state ouputs of the shift register 12 via the bus 10a to the address inputs A0–A7 of the ROM 10. The ROM 10 also includes a trend table which is accessed under the control of the timing signal T2 which provides a corresponding trend data byte at the data outputs D0–D7. The trend table is listed in the following Table B:

TABLE B

Hexadecimal listing of trend table in the ROM 10.

```
 ┌─ μLaw/A Law Indicator
 │ ┌─ Comparison Bytes (From Bus 10a)
 │ │   ┌─ Trend Code
 ∧ ∧   ∧
```

| | | | | | | | | | | | | | | | | | |
|---|---|---|---|---|---|---|---|---|---|---|---|---|---|---|---|---|---|
|4|0|0|00|00|00|00|00|81|01|01|00|00|01|00|00|00|00|00|00|
|4|1|0|00|00|00|00|00|00|00|00|00|00|00|00|00|00|00|00|00|
|4|2|0|00|00|00|00|00|00|00|00|00|00|00|00|00|00|00|00|00|
|4|3|0|00|00|00|00|00|00|00|00|00|00|00|00|00|00|00|00|00|
|4|4|0|00|00|00|00|00|81|81|81|00|00|81|00|00|00|00|00|00|
|4|5|0|00|00|00|00|00|00|00|00|00|00|00|00|00|00|00|00|00|
|4|6|0|00|00|00|00|00|00|00|00|00|00|00|00|00|00|00|00|00|
|4|7|0|00|00|00|00|00|00|00|00|00|00|00|00|00|00|00|00|00|
|4|8|0|00|00|00|00|00|81|01|01|00|00|01|00|00|00|00|00|00|
|4|9|0|00|00|00|00|00|00|00|00|00|00|00|00|00|00|00|00|00|
|4|A|0|00|00|00|00|00|00|00|00|00|00|00|00|00|00|00|00|00|
|5|0|0|00|00|00|00|00|81|01|01|00|00|01|00|00|00|00|00|00|
|5|1|0|00|00|00|00|00|00|00|00|00|00|00|00|00|00|00|00|00|
|5|2|0|00|00|00|00|00|00|00|00|00|00|01|01|00|00|00|00|00|
|5|3|0|00|00|00|00|00|00|00|00|00|00|00|00|00|00|00|00|00|
|5|4|0|00|00|00|00|00|81|81|81|00|00|81|00|00|00|00|00|00|
|5|5|0|00|00|00|00|00|00|00|00|00|00|00|00|00|00|00|00|00|
|5|6|0|00|00|00|00|00|00|00|00|00|00|00|00|00|00|00|00|00|
|5|7|0|00|00|00|00|00|00|00|00|00|00|00|00|00|00|00|00|00|
|5|8|0|00|00|00|00|00|81|01|01|00|00|01|00|00|00|00|00|00|
|5|9|0|00|00|00|00|00|00|00|00|00|00|00|00|00|00|00|00|00|
|5|A|0|00|00|00|00|00|00|00|00|00|00|00|00|00|00|00|00|00|

Figure 2:
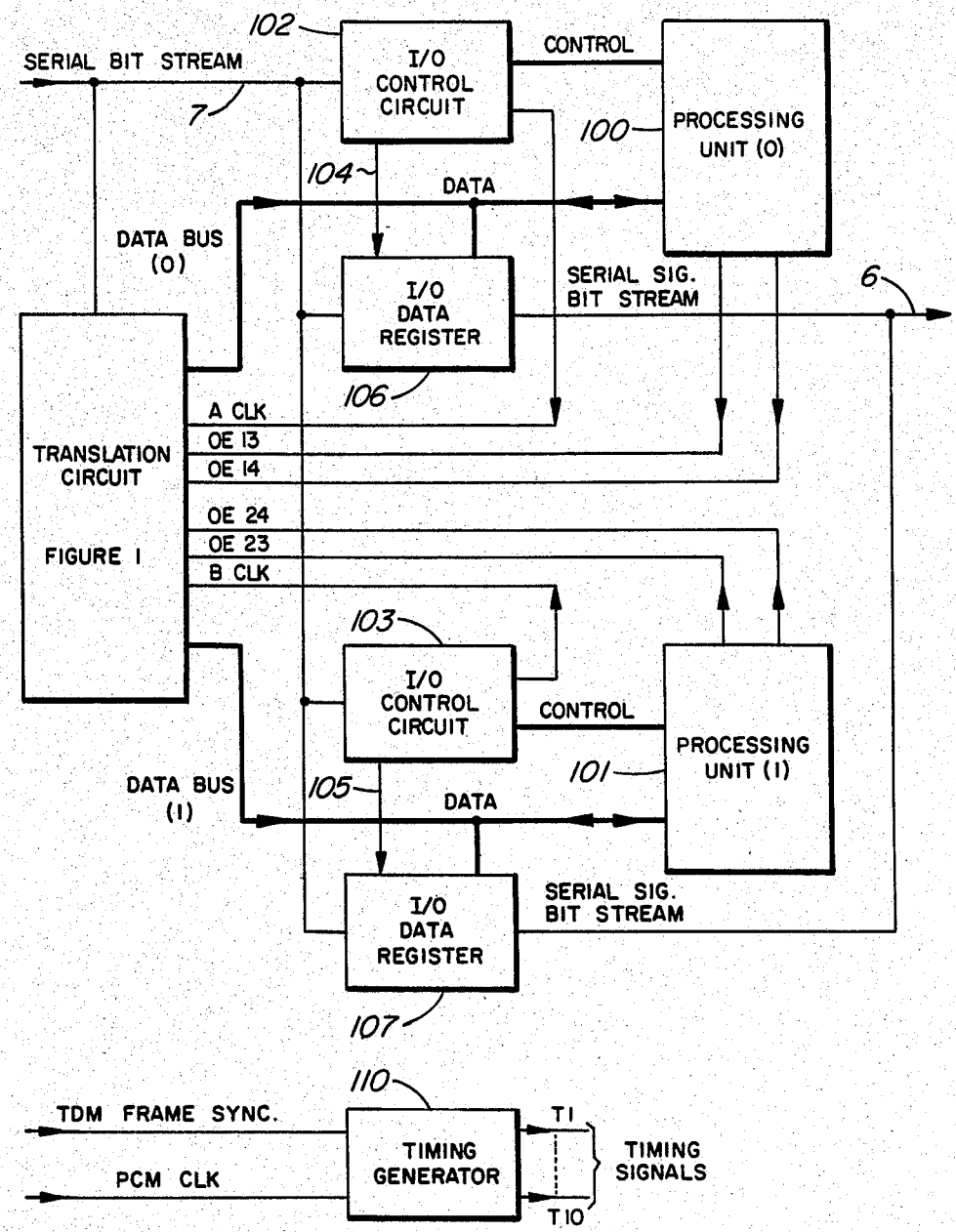
FIG. 2 is a block diagram of the call progress signal monitor generally illustrating detection circuits interconnected with corresponding telephone system interface circuits and the translation circuit in FIG. 1.
Figure 4:
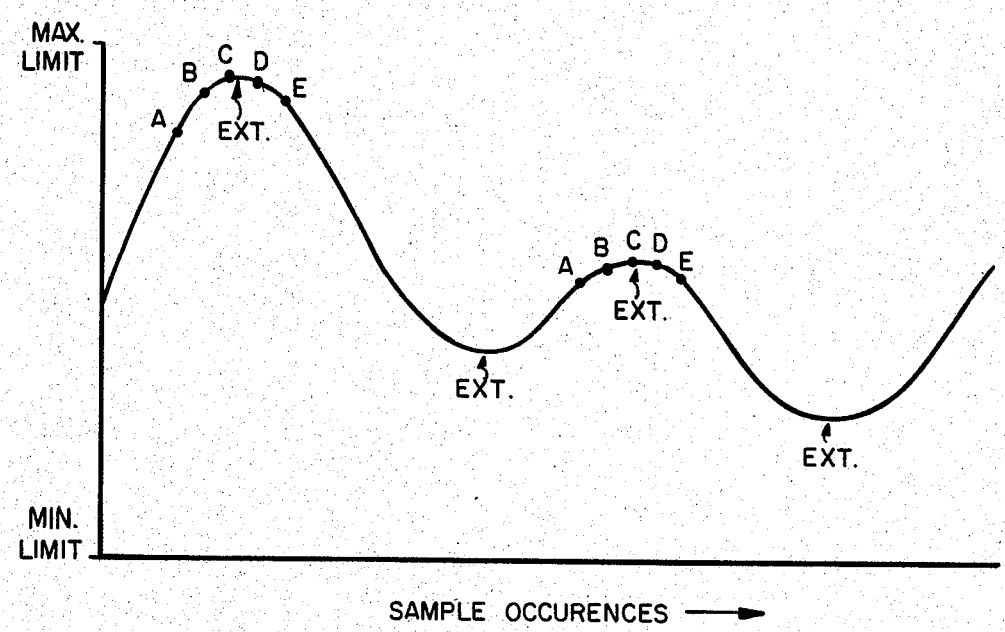
FIG. 4 is a graphical representation of exemplary code value signal translations performed by the operation of the translation circuit in FIG. 1.

The trend table is used to convert the trend information from the shift register 12 into a form adapted for convenient use in a digital processor implemented detection circuit, for example as generally illustrated in FIG. 2. The trend table in the ROM 10 provides codes each of which describes a combination of consecutive sample comparisons over a five sample span including an instant sample and the four previous samples. One of the combinations corresponding to trend code 01, defines a peak occurrence by distinguishing a trend reversal from that of a positive going trend to a negative going trend. Two such peak occurrences are illustrated in FIG. 4 wherein an exemplary series of samples are plotted against a horizontal axis representing sample occurrences and a vertical axis representing code values between minimum and maximum limits. Each peak amplitude occurrence or extreme value is labelled EXT. Peak amplitude occurrences in the direction of the maximum limit are characterized by a peak sample C being preceded and followed by lesser value samples. Hence a peak occurrence is defined when samples A, B, C, D and E are of such values that:

$$A < B \approx C > D \text{ or } A \leq B \approx C \approx D > E$$

Another of the combinations, wherein C is greater than B and D corresponds to trend code 81 which also indicates a peak amplitude occurrence. However trend code 81 is also intended to indicate that the peak amplitude occurrence might be a result of noise encoded in the PCM signal and hence is of a lesser degree of reliability as compared to a peak amplitude occurrence corresponding to the trend code 01. The trend data byte at the data outputs D0–D7 is stored in a trend buffer register 14 under the control of the positive going edge of the timing signal T8 being applied at an input enable IE of the trend buffer register 14. Thereafter the stored trend data byte is available on the data bus (0) in response to a signal assertion applied at an output enable OE of the trend buffer register 14.

Operation of the translation circuit with respect to a second channel in the TDM serial bit stream is essentially the same as in the foregoing description except that the registers labelled (1) and the data bus labelled (1) are involved. The registers are primarily governed in operation by the timing signals T9 and T10.

Referring to FIG. 2, channel 0 and channel 1 detection circuits are provided by processing units 100 and 101. Briefly, the processing units 100 and 101 communicate with respective input/output (I/O) control circuits 102 and 103 via interconnecting control buses. The processing unit 100 is connected to communicate with an input/output (I/O) data register 106 via a data bus as shown. Likewise, the processing unit 101 is connected to communicate with an input/output (I/O) data register 107 via a data bus as shown.

The I/O data registers 106 and 107 interface the respective processing units with a signalling channel in the telephone system. The I/O data registers 106 and 107 each function to provide serial to parallel information bit inputs from the associated telephone system via the lead 7 to the respective processing units 100 and 101 and also to provide parallel to serial information bit outputs from the respective processing units 100 and 101 to the associated telephone system via a lead 6. Operations of the I/O data registers 106 and 107 are controlled by the I/O control circuits 102 and 103 via respective control paths 104 and 105 in response to channel enable clock signals and predetermined header bits as they occur in a signalling channel in the serial bit stream on the lead 7. A requirement for monitoring progress tones in a specific TDM channel is communicated from the telephone system to an idle one of the processing units 100 and 101 via its associated I/O data register. The processing unit then solicits the instant data byte and the trend data byte for the corresponding channel. The translation circuit responds as previously described in the discussion of FIG. 1.

Both of the processing units 100 and 101 operate on the basis of peak detection and instant code value input information. Each of the processing units 100 and 101 is programmed to detect the presence of progress tones and silence. Peak occurrence count information is used for determining the frequency of a single frequency tone or the higher frequency in a dual frequency tone. In one example the determination of frequency is performed over a 50 millisecond period as follows:

$$F_1 = \frac{\text{TOTAL NUMBER OF PEAKS DETECTED} - 1}{\text{TIME BETWEEN FIRST AND LAST PEAK}}$$

If the tone is a dual frequency tone, F1 is the higher of the two frequencies and a second frequency F2 is the lower of the two frequencies. F2 is determined as a function of a frequency (FE) of the dual frequency tone. The existence of an envelope is determined by an amplitude difference between peak occurrences. The frequency FE of the envelope is determined similar to the method by which the frequency F1 was determined with the envelope period being defined as twice the time between the largest and smallest of the peak amplitude occurrences. The frequency F2 is determined by subtracting FE from F1.

Cadence of a tone is determined on the basis of detection of peak sample amplitude during individual 10 millisecond periods whereby transitions between substantial signal amplitude (ON) and little or no signal amplitude (OFF) are detected with 10 ms resolution.

The rms voltage amplitude of dual tone signals with 3 decibels or less of twist is determined to within about 95 percent of the actual value by way of an estimation using the highest peak value occurences over three consecutive 50 ms periods.

On the basis of the above derived information, call progress tones and silence are detectable by machine comparison with predetermined parameters stored in association with each of the processing units 100 and 101.

A call progress signal monitor based on principles of construction and operation as hereinbefore disclosed may also be useful as a voice signal detector in the case where voice is defined as an occurrence of frequency detection which does not fall within any of the predetermined parameters.

What is claimed is:

1. A call progress signal monitor which includes a translation circuit for generating data signals indicative of predetermined characteristics in a bit stream of plural bit encoded positive and negative sign samples, and a detection circuit being responsive to the data signals for detecting call progress tones, and silence, the call progress monitor being characterized in that the translation circuit comprises:
   a translation means for translating an instant occurring sample into an instant data word having a code value with reference to a maximum possible value of the sample;
   a comparing means for generating a comparison value signal in response to code values of the instant data word and an immediately previous data word; and
   encoding means for generating a trend code in response to an instant comparison value signal and a plurality of consecutive previous comparison value signals;
   each of the data signals being comprised of said instant data word and a corresponding instant trend code.

2. A call progress signal monitor as defined in claim 1 wherein the translation means comprises: means for serially receiving pulse code modulated (PCM) signals corresponding to a channel of said samples in a time division multiplex (TDM) signal stream and for providing corresponding parallel bytes for addressing a read only memory (ROM) for generating the instant data word in accordance with a translation table stored in the ROM.

3. A call progress signal monitor as defined in claim 1 wherein the comparing means comprising a last sample register being operative to store the code value of the data word having occurred immediately previous to the instant data word and a digital comparator being responsive to the instant data word from the translation means and to the code value stored in the last sample register for generating each of the comparison value signals, each of the comparison value signals having two bits, one of which when being asserted indicates that the code values of the instant and previous data words are equal and the other of which when being asserted indicates that the instant data word is less than the code value of the previous data word.

4. A call progress signal monitor as defined in claim 1 wherein the encoding means comprises means for sequentially registering a plurality of the comparison value signals from the comparing means and providing a corresponding parallel binary word for addressing a read only memory (ROM) for generating the trend code in accordance with an encoding table stored in the ROM.

5. A call progress signal monitor for distinguishing call progress tones in a PCM bit stream, comprising:
   means being responsive to PCM bytes for providing code values in a range being defined by predetermined limits of maximum and minimum values corresponding to negative and positive sign PCM bytes of maximum value;
   means being responsive to a series of the code values for generating a series of trend codes, at least one of the trend codes being unique to indicate an occurrence of an increasing trend in the code values changing to a decreasing trend in the code values; and
   detection means being responsive to the code values and the trend codes for detecting progress tones in accordance with predetermined characteristics in a series of code value occurrences in combination with a series of trend code occurrences.

6. In a call progress signal monitor, a method for generating data signals being indicative of predetermined characteristics in a bit stream of plural bit encoded positive and negative signal samples, comprising the steps of:
   translating each instant occurring sample into an instant data word having a code value with reference to a predetermined reference value corresponding to at least a maximum possible value of the samples;
   comparing the code value of each instant data word with the code value of an immediately previously occurring data word, and generating a comparison value signal in response to each of the comparisons;
   encoding a combination of each instant comparison value signal and a plurality of its consecutive predecessors to generate trend codes;
   each of the data signals being comprised of the code value of said instant data word and a corresponding instant trend code.

7. A method for machine distinguishing a call progress signal as typically is used in a telephone system, comprising the steps of:

translating signal samples from a communication path in the telephone system into corresponding data words each having a code value in a range being defined by predetermined limits of maximum and minimum values, wherein maximum amplitude positive and negative sign signal samples each correspond to a respective one of said limits, and deriving a first frequency component in a series of the signal samples as a reciprocal of an average period of time between ones of the signal samples occurring with extreme code values in a direction toward one of said limits, whereby the highest frequency component in a call progress signal is defined;

in response to the extreme code values being dissimilar, deriving an envelope frequency component as a reciprocal of a period of time between the extreme code values occurring with a greatest value difference, and deriving a second frequency component as a difference of the envelope frequency being subtracted from the first frequency whereby a frequency component being lower than the highest frequency component is defined in the call progress signal.

* * * * *